(12) United States Patent
Rodriguez et al.

(10) Patent No.: US 9,346,406 B2
(45) Date of Patent: May 24, 2016

(54) MOTOR VEHICLE EQUIPPED WITH DYNAMIC FLOOR SECTION

(71) Applicant: FORD GLOBAL TECHNOLOGIES, LLC, Dearborn, MI (US)

(72) Inventors: Ricardo Ignacio Medina Rodriguez, Mexico City (MX); Francisco Javier Villanueva, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/719,349

(22) Filed: May 22, 2015

(65) Prior Publication Data

US 2016/0114713 A1    Apr. 28, 2016

Related U.S. Application Data

(63) Continuation-in-part of application No. 14/524,294, filed on Oct. 27, 2014, now Pat. No. 9,132,777.

(51) Int. Cl.
*B60R 5/04* (2006.01)

(52) U.S. Cl.
CPC ........................................ *B60R 5/04* (2013.01)

(58) Field of Classification Search
CPC ......................................................... B60R 5/04
See application file for complete search history.

(56) References Cited

U.S. PATENT DOCUMENTS

| | | | | |
|---|---|---|---|---|
| 2,898,146 A | * | 8/1959 | Yudenfreund | B60R 13/01 296/39.1 |
| 3,476,432 A | * | 11/1969 | Phillips | B60N 3/001 296/156 |
| 5,544,998 A | | 8/1996 | Malinowski | |
| 6,516,983 B2 | | 2/2003 | Sotiroff et al. | |
| 6,908,139 B1 | * | 6/2005 | Szieff | B60J 7/141 296/100.03 |
| 7,188,881 B1 | | 3/2007 | Sturt et al. | |
| 7,992,912 B2 | | 8/2011 | Klotz et al. | |
| 2003/0057724 A1 | * | 3/2003 | Inagaki et al. | B60N 2/3013 296/37.8 |
| 2007/0065264 A1 | | 3/2007 | Sturt et al. | |
| 2008/0178428 A1 | * | 7/2008 | McDonald | B60R 7/04 16/344 |
| 2008/0277957 A1 | * | 11/2008 | Hirayama et al. | B60R 5/047 296/37.16 |
| 2008/0284214 A1 | * | 11/2008 | Neale | B60N 2/06 297/15 |
| 2009/0212584 A1 | * | 8/2009 | Hill | B60R 7/02 296/37.5 |
| 2010/0176620 A1 | * | 7/2010 | Micheli | B60N 2/005 296/63 |
| 2011/0241372 A1 | * | 10/2011 | Kusu | B60R 5/048 296/24.43 |
| 2012/0261935 A1 | * | 10/2012 | Perez | B60R 5/048 296/24.4 |

FOREIGN PATENT DOCUMENTS

DE    102004051622 A1    4/2006
EP        1852308 A1    11/2007
(Continued)

OTHER PUBLICATIONS

English machine translation of DE102004051622.
(Continued)

*Primary Examiner* — Lori L Lyjak
(74) *Attorney, Agent, or Firm* — Vichit Chea; King & Schickli, PLLC

(57) ABSTRACT

A vehicle incorporates a storage area with a dynamic floor section. That dynamic floor section includes a plurality of interconnected panels that slide and fold so as to be displaceable between a home position and a shifted position. Advantageously, the movement of the panels allows better access to objects resting on the dynamic floor section.

19 Claims, 9 Drawing Sheets

(56) References Cited

FOREIGN PATENT DOCUMENTS

| | | | |
|---|---|---|---|
| EP | 2228262 | A1 | 9/2010 |
| GB | 2309448 | A | 7/1997 |
| WO | 0181117 | A1 | 11/2001 |

OTHER PUBLICATIONS

English machine translation of EP1852308.
English machine translation of EP2228262.
English machine translation of WO0181117.

* cited by examiner

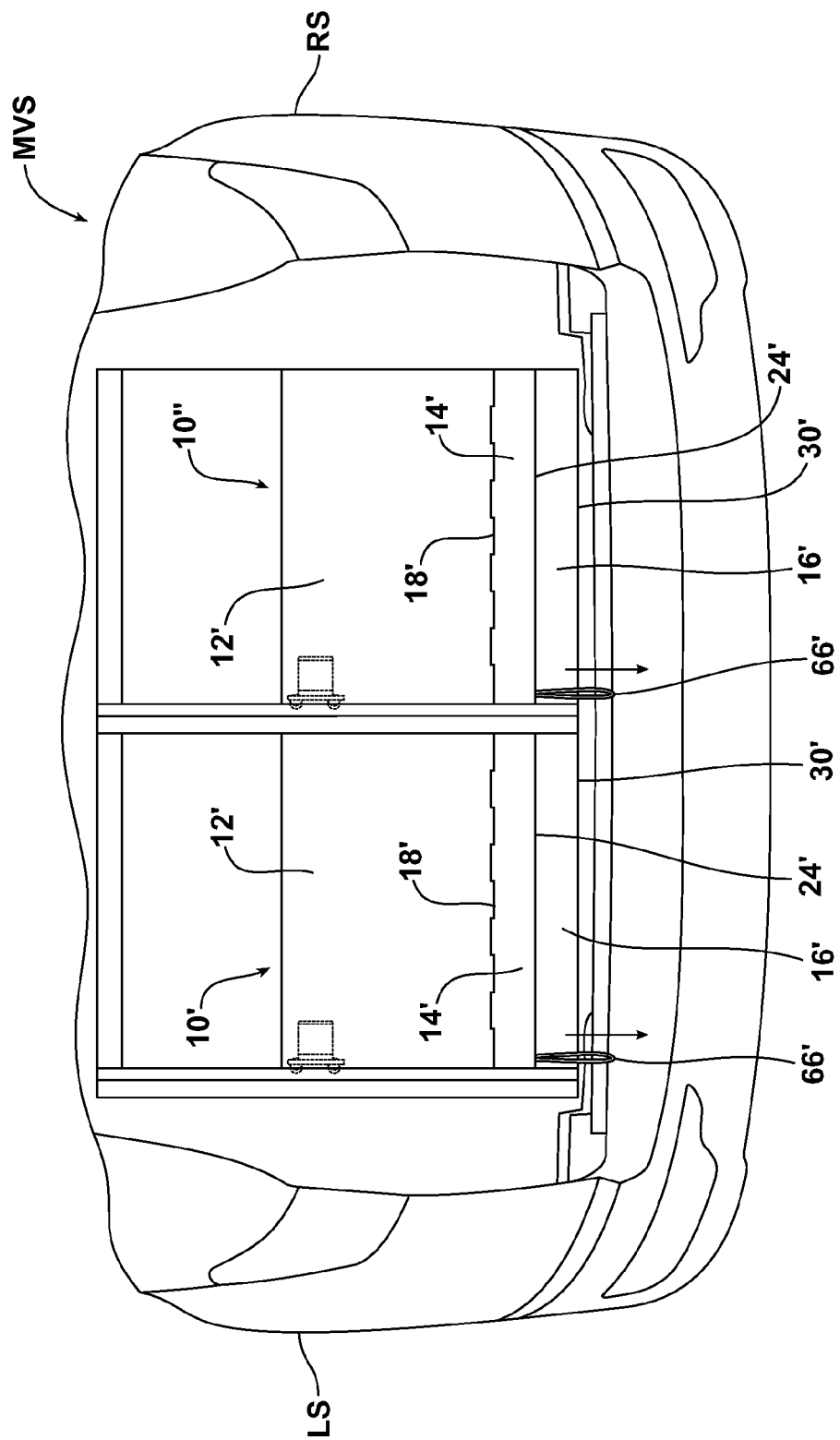

MOTOR VEHICLE EQUIPPED WITH DYNAMIC FLOOR SECTION

This application is a continuation-in-part (CIP) of U.S. patent application Ser. No. 14/524,294, filed on 27 Oct. 2014, the full disclosure of which is incorporated herein by reference.

TECHNICAL FIELD

This document relates generally to the motor vehicle field and, more particularly, to a motor vehicle equipped with a dynamic floor section displaceable between a home position and a shifted position so as to allow better access to objects carried on otherwise hard to reach areas of the floor.

BACKGROUND

This document relates generally to a vehicle incorporating a dynamic floor section which functions to allow better access to a storage area in the vehicle. The dynamic floor section is particularly useful in a vehicle incorporating a rear tailgate or door that is hinged at the side and swings open. When such a vehicle is parked near an obstruction, the rear door or tailgate may only be opened a limited amount. While that opening may allow reasonable access to the storage area adjacent the latch side of the swinging tailgate, it may severely limit access to the storage area adjacent the hinge side of the swinging tailgate. Advantageously, the dynamic floor section shifts toward the open or latch side of the tailgate to allow one to access the objects previously positioned and effectively out of reach adjacent the hinge side of the tailgate including, particularly, those objects toward the front of the storage area away from the tailgate.

SUMMARY

In accordance with the purposes and benefits described herein, a vehicle is provided incorporating a storage area that comprises a dynamic floor section. That dynamic floor section includes a plurality of interconnected panels that slide and fold so as to be displaceable between a home position and a shifted position. In one possible embodiment, the plurality of interconnected panels includes a first panel, a second panel and a third panel. A first hinge connects the first panel with the second panel and a second hinge connects the second panel with the third panel. Further a third hinge connects the third panel to the vehicle.

In one possible embodiment, the first panel has a width $W_1$, the second panel has a width $W_2$ and the third panel has a width $W_3$ where $W_1 > W_2$ or $W_3$. In one possible embodiment, the first panel is positioned vehicle forward of the second and third panels.

In yet another embodiment, the storage area further includes a second dynamic floor section including a second plurality of interconnected panels that slide and fold so as to be displaceable between home and shifted positions. This second dynamic floor section may be positioned beside the first dynamic floor section.

In accordance with yet another aspect, a method is provided to improve access to a vehicle forward portion of a storage area accessed from an opening at a rear end of the vehicle. That method may be broadly defined as comprising the step of equipping the storage area with a dynamic floor section including a plurality of interconnected panels that slide and fold so as to be displaceable between home and rearwardly shifted positions.

The method may further include construction of the dynamic floor section from a first panel, a second panel and a third panel wherein the first panel is connected to the second panel by a first hinge and the second panel is connected to the third panel by a second hinge. Still further, the third panel is connected to the vehicle floor or body by a third hinge. The first panel is also provided vehicle forward of the second panel and the third panel. In one possible embodiment, the first panel has a larger surface area than the second and third panels. In another possible embodiment, the first panel has a larger surface area than the second and third panels combined.

In another possible embodiment, the method includes equipping the storage area with a second dynamic floor section including a second plurality of interconnected panels that slide and fold in a similar manner to the first dynamic floor section so as to be displaceable between the home position and the rearwardly shifted position.

Still further, the method may include providing handles for independent operation of the two dynamic floor sections. The second dynamic floor section may be positioned beside the first dynamic floor section. In one possible embodiment, the first dynamic floor section is positioned between a center line and an outer left side of the motor vehicle while the second dynamic floor section is positioned between the center line and the outer right side of the motor vehicle.

In the following description, there is shown and described several preferred embodiments of the vehicle and the dynamic floor section. As it should be realized, the vehicle and the dynamic floor section is capable of other, different embodiments and its several details are capable of modification in various, obvious aspects all without departing from the vehicle and dynamic floor section as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle and dynamic floor section and together with the description serve to explain certain principles thereof. In the drawing figures:

FIGS. 8a and 8b are perspective views illustrating another embodiment of the cargo storage area adapted for use in a motor vehicle sedan. FIG. 8a illustrates two, side-by-side dynamic floor sections in their home positions while FIG. 8b illustrates those dynamic floor sections in their shifted positions.

Reference will now be made in detail to the present preferred embodiment of the vehicle and dynamic floor section, examples of which are illustrated in the accompanying drawings.

DETAILED DESCRIPTION

Figure 1:
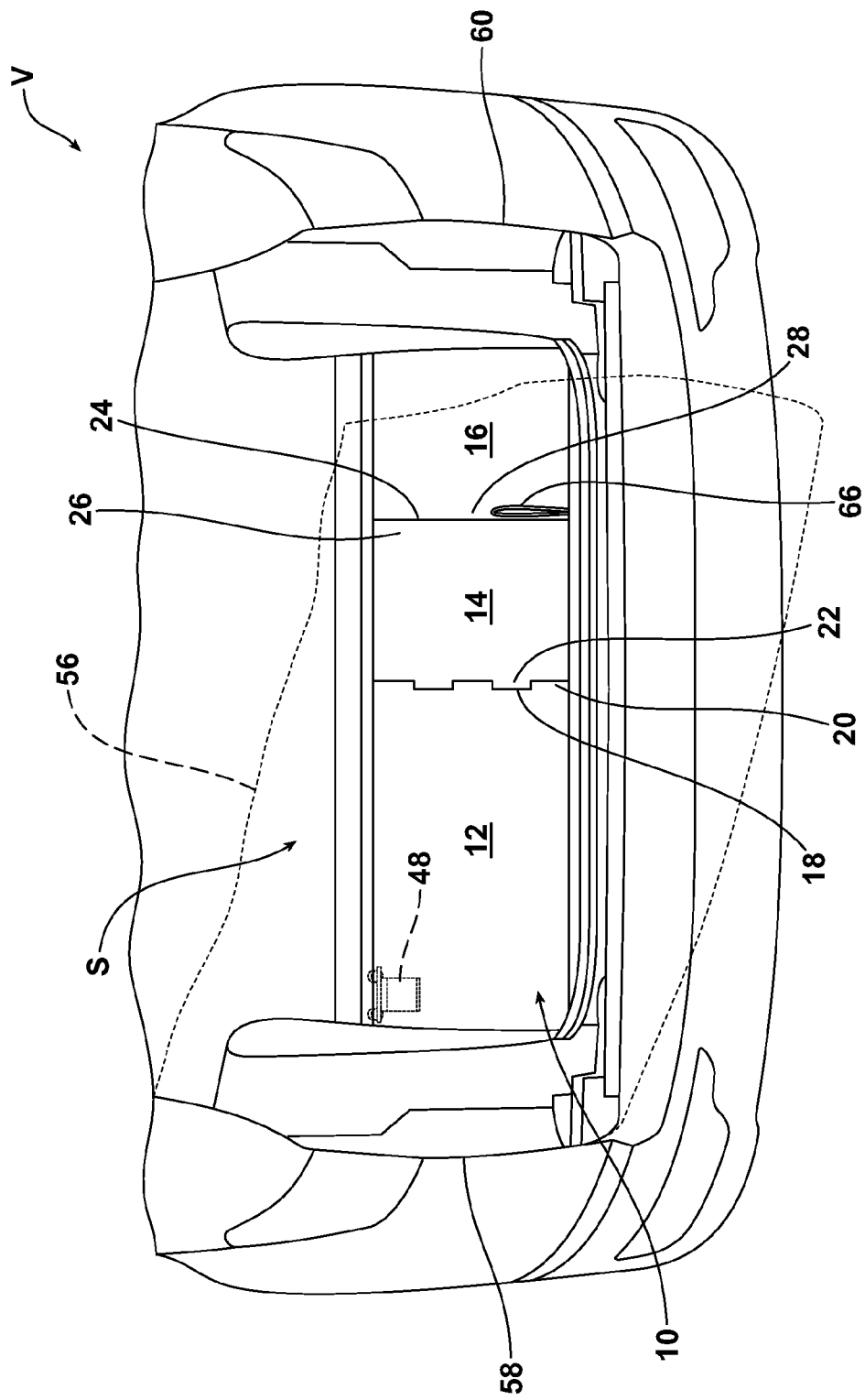
FIG. 1 is a rear view of the vehicle illustrating the cargo or storage area including the dynamic floor section and further illustrating a partially opened side hinged tailgate outlined in phantom so as to allow unlimited access to the latch side of the dynamic floor section within the vehicle. The dynamic floor is shown in the flat or home position.

Reference is now made to FIG. 1 illustrating a vehicle V and, more particularly, the storage area S of that vehicle. As illustrated, the storage area S includes a dynamic floor section 10 which includes a plurality of interconnected panels 12, 14, 16. As will be described in greater detail below, these panels 12, 14, 16 slide and fold so as to be displaceable between the home or flat position illustrated in FIG. 1 to an intermediate position illustrated in FIG. 2 to a fully shifted position illustrated in FIG. 3. A first hinge 18 connects edge 20 of the first panel 12 with the edge 22 of the second panel 14. A second hinge 24 connects the edge 26 of the second panel 14 with the edge 28 of the third panel 16. A third hinge 30 connects the edge 32 of the third panel 16 to the vehicle V (see also FIG. 5). In the illustrated embodiment that connection is made to a stationary floor section 34. The first, second and/or third hinges 18, 24, 30 may be mechanical hinges or living hinges. Living hinges may be made by the same floor carpet that wraps the three panels 12, 14, 16.

Figure 2:
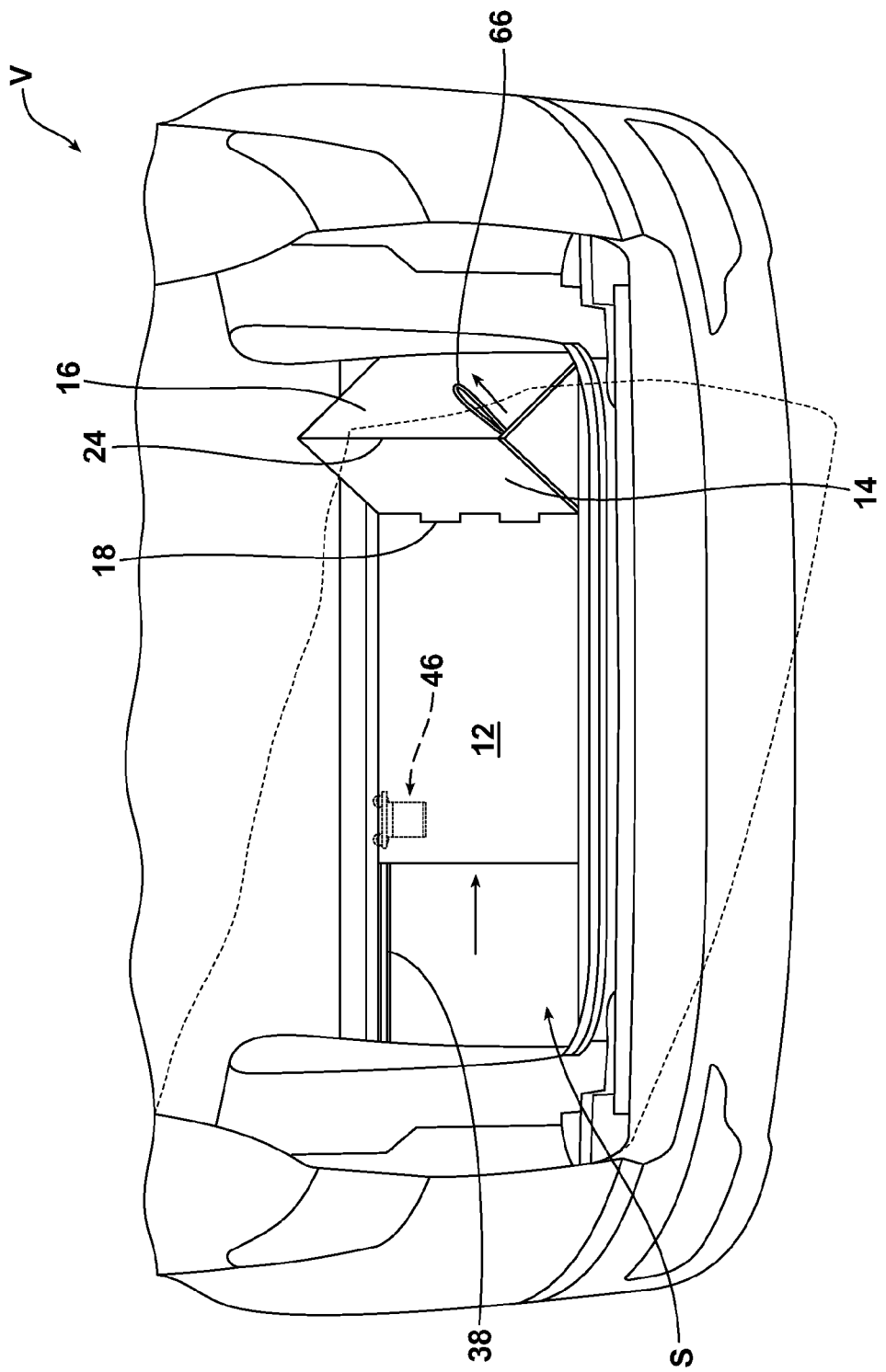
FIG. 2 is a rear view similar to FIG. 1 but illustrating the dynamic floor section partially folded and shifted toward the latch side of the vehicle.
Figure 3:
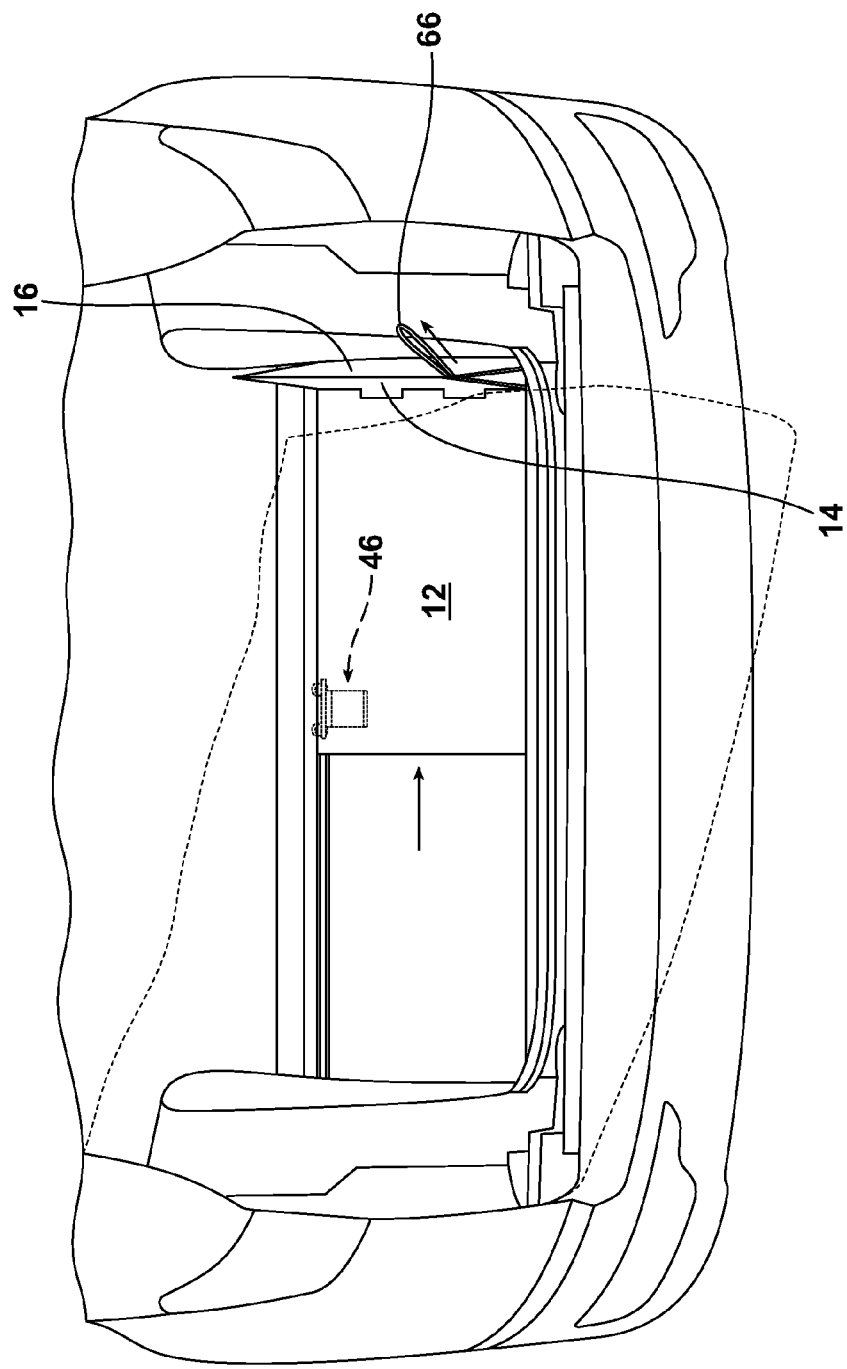
FIG. 3 is a rear view similar to FIGS. 1 and 2 but showing the dynamic floor section fully shifted toward the latch side of the vehicle so as to enable one to access objects carried on the dynamic floor section that were out of reach on the tailgate hinge side of the vehicle when the dynamic floor section was in the home position illustrated in FIG. 1.
Figure 4:
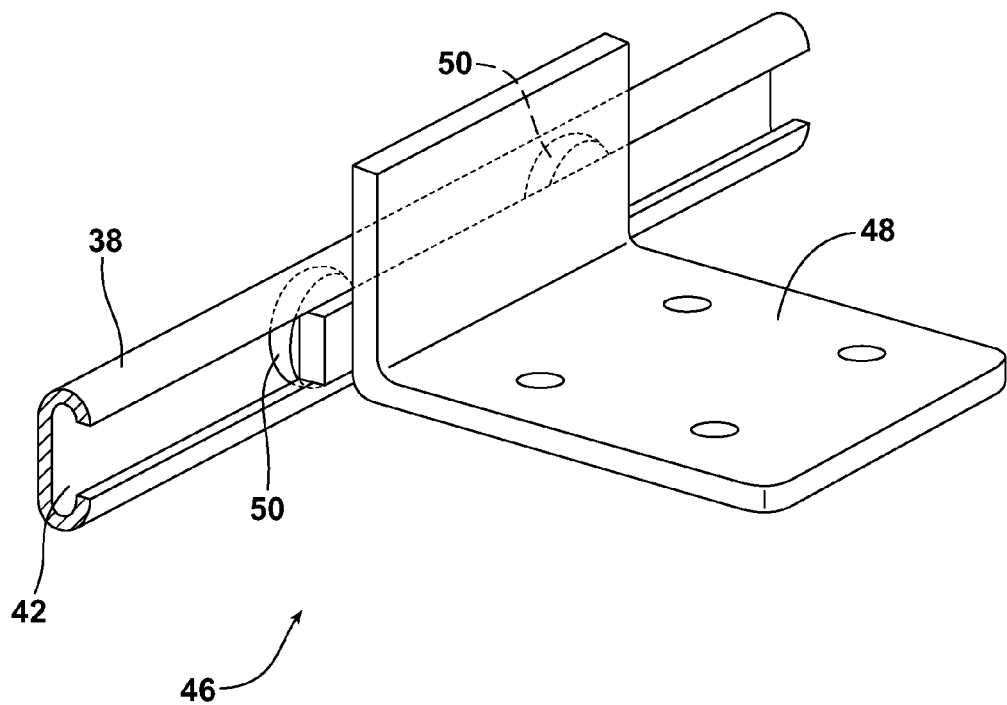
FIG. 4 is a detailed perspective view illustrating a support bracket, a set of guide rollers and one of the guide rails engaged by those rollers.

As further illustrated by FIGS. 1-6, as the first panel 12 is shifted from the home position illustrated in FIG. 1 to the fully shifted position illustrated in FIG. 3, it remains flat and slides along a stationary guide track generally designated by reference numeral 36. That guide track 36 includes first and second opposed guide rails 38, 40. Guide rail 38 includes a guide channel 42 while guide rail 40 includes a guide channel 44. As should be appreciated, the guide rails 38, 40 are mounted to the body of the vehicle V.

Figure 5:
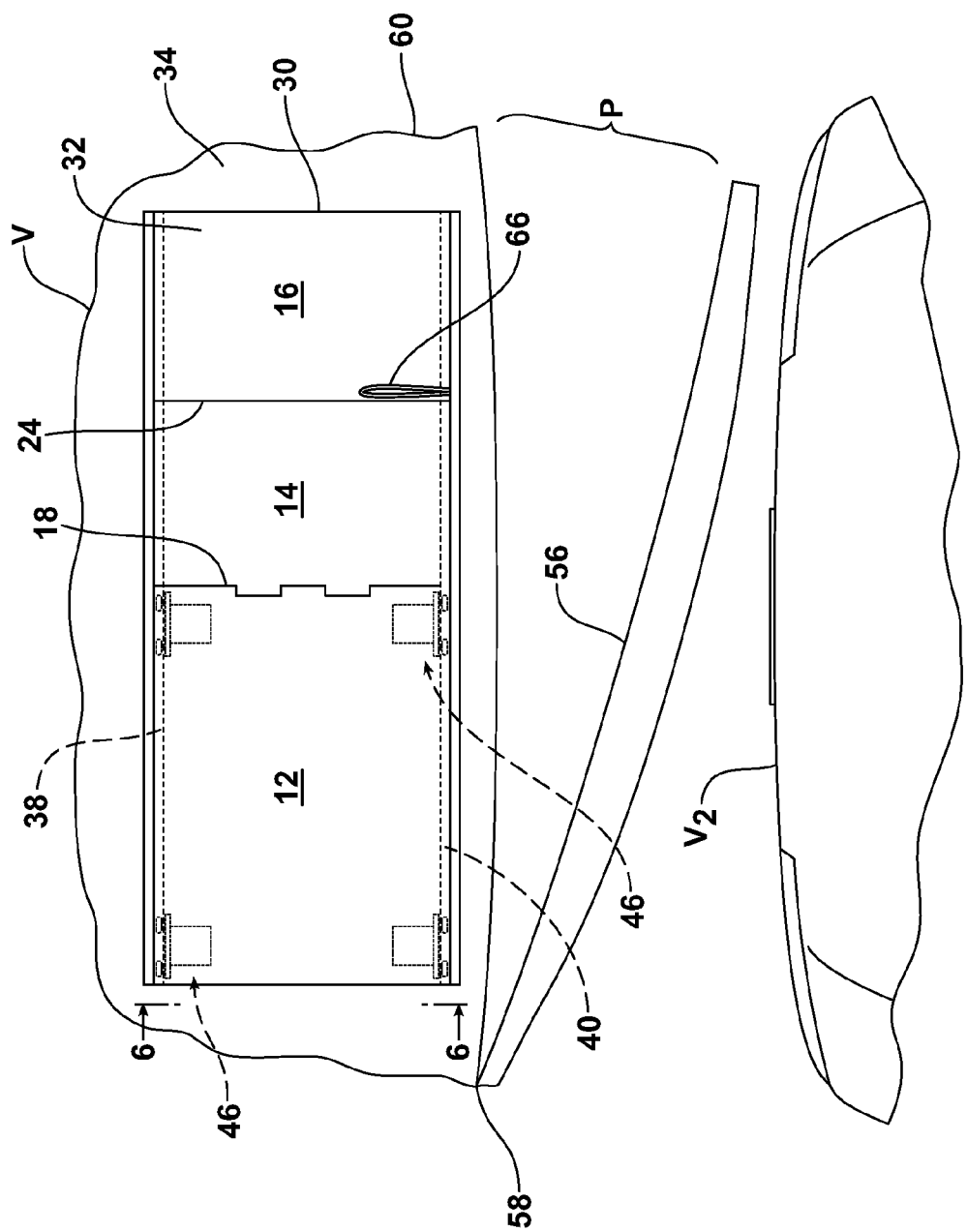
FIG. 5 is a top plan view illustrating the opposed guide rails and the guide track followers connected to the first panel.
Figure 6:
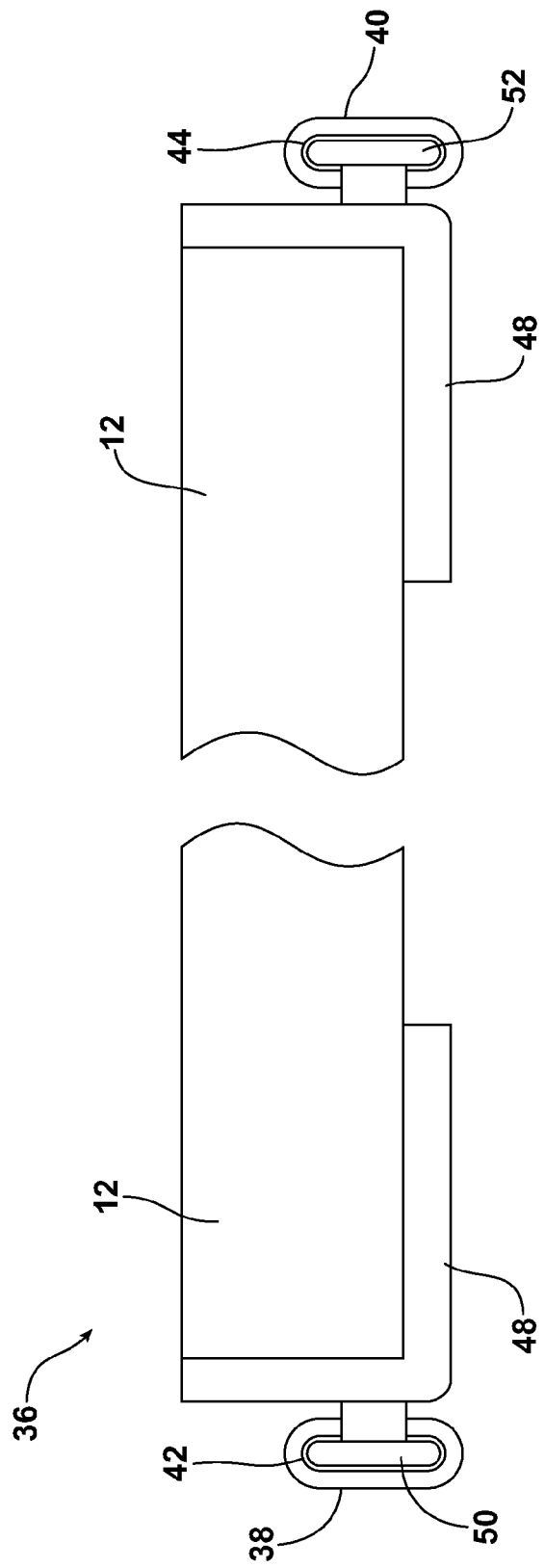
FIG. 6 is an end view illustrating the opposed guide rails of the guide track and the guide track followers connected to the first panel.

A cooperating guide track follower, generally designated by reference numeral 46, is mounted to the underside of the first panel 12. As best illustrated in FIGS. 5 and 6, the guide track follower 46 comprises four brackets 48, one mounted to the underside of the first panel 12 adjacent each corner. The brackets 48 along one edge of the first panel 12 include a first set of rollers 50. The brackets 48 on the opposite edge of the first panel include a second set of rollers 52. The first set rollers 50 are secured in and ride along the guide channel 42 in the guide rail 38 while the second set of rollers 52 are received in and ride along the guide channel 44 in the guide rail 40.

As should be further appreciated, the storage area S of the vehicle V in the illustrated embodiment is equipped with a side hinged door or tailgate 56. That tailgate 56 is connected to the vehicle V by a hinge (not shown) on the tailgate side 58 of the vehicle and swings open on the latch side 60 of the vehicle.

As should be appreciated, a nearby obstruction (a front of a second vehicle $V_2$ in FIG. 5) may limit the angle to which the tailgate 56 may swing open making it very difficult to access any object resting upon the first panel 12 of the dynamic floor section 10.

As should be further appreciated from reviewing the drawing figures, the first, second and third panels 12, 14, 16 extend transversely across the vehicle V from the first or hinge side 58 to the second or latch side 60 with the first panel oriented toward the hinge side and the third panel oriented toward the latch side. Further, the first, second and third hinges 18, 24, 30 for the panels 12, 14, 16 extend in an axial direction substantially parallel to a longitudinal axis of the vehicle V. Thus, the hinges 18, 24, 30 also extend in an axial direction substantially perpendicular to the tailgate 56 when it is in a closed position. As a consequence, when an individual wishes to access any object lying on the first panel 12 he may engage the handle 66 attached to the third panel 16 adjacent the second hinge 24 and pull upwardly toward the latch side 60 of the vehicle V. When this is done the first panel 12 slides along the guide track 36 while maintaining a flat position, the second panel 14 pivots about the hinge 18 and the third panel 16 pivots about the hinges 24 and 30. Thus, the second and third panels 14, 16 rise above the first panel 12 and fold together (see FIG. 2) as the first panel slides across the guide track 36 on the rollers 50, 52 toward the latch side 60 and into the shifted position illustrated in FIG. 3. In this position, the individual may more easily access the object which is now within ready reach through the pie-slice shaped space (shown at P in FIG. 5) provided by the open tailgate 56.

In order to provide for the best possible operation, it should be appreciated that the first panel 12 has a width $W_1$, the second panel 14 has a width $W_2$ and the third panel 16 has a width $W_3$ where the width $W_1 > W_2$ or $W_3$. In one particularly useful embodiment, the width $W_1$ of the first panel 12 is greater than or equal to the width $W_2$ of the second panel plus the width $W_3$ of the third panel 16.

As should be appreciated, the foregoing also describes a method of improving access to an area (i.e. the first panel 12) of a dynamic floor section 10 of a vehicle V equipped with a side hinge tailgate 56. That method may be broadly described as including the step of shifting the dynamic floor section 10 from the hinge side 58 toward the latch side 62 of the vehicle V. As also illustrated in FIGS. 1-3, this shifting of the dynamic floor section 10 includes folding and sliding the dynamic floor section toward the latch side 62 of the vehicle V.

Figure 8A:
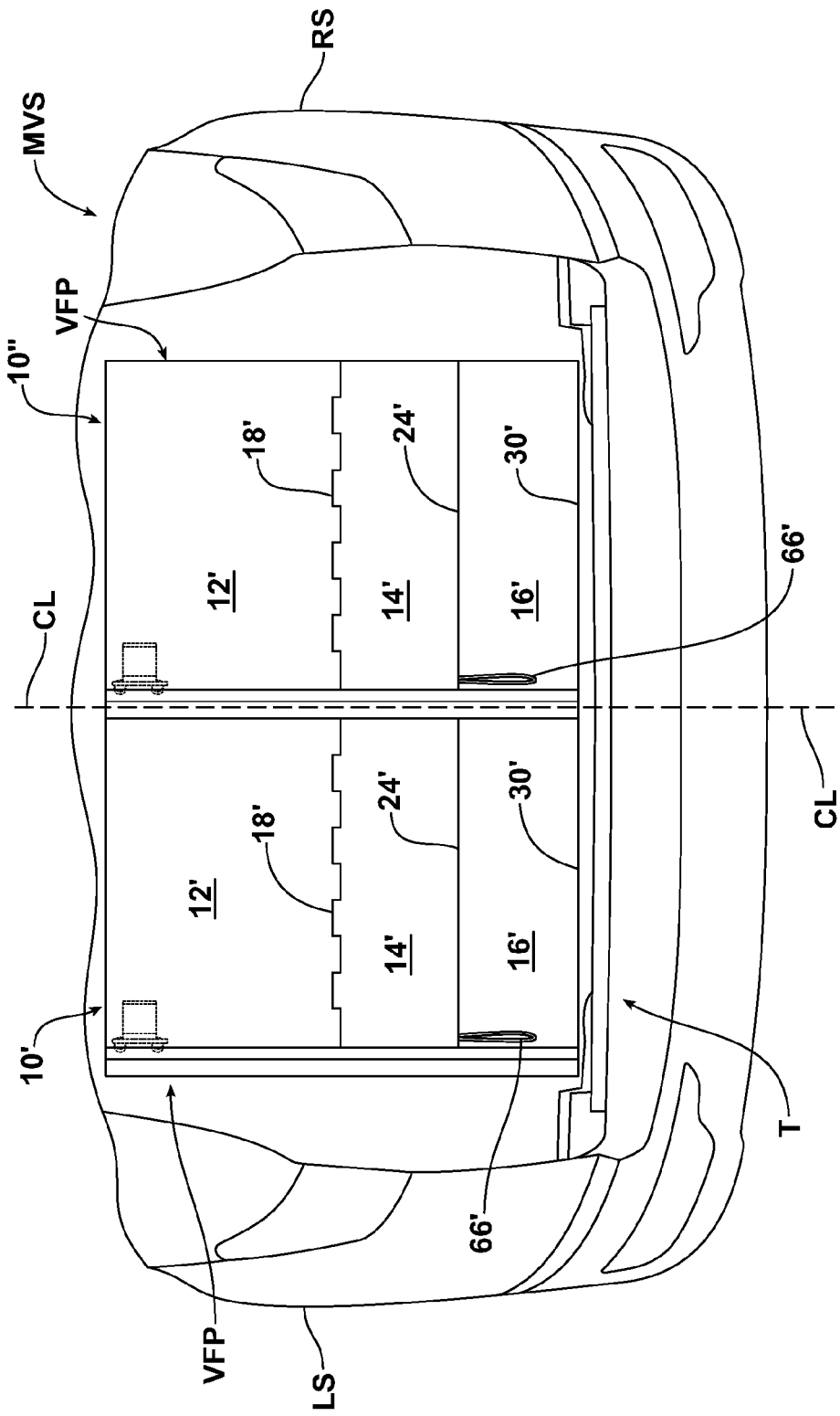

Reference is now made to FIGS. 8a and 8b illustrating a motor vehicle sedan MVS including a storage area or trunk T including two, side-by-side dynamic floor sections 10', 10" which each include a plurality of interconnected panels 12', 14', 16'. Just as described above with regard to the first embodiment illustrated in FIGS. 1-6, the panels 12', 14', 16' of each section 10', 10" independently slide and fold so as to be displaceable from the flat, home position illustrated in FIG. 8a to the fully shifted position illustrated in FIG. 8b. The only difference is the sliding and folding action occurs along the longitudinal (front to rear) axis of the motor vehicle sedan MVS instead of transversely across the motor vehicle V as in the FIGS. 1-6 embodiment.

While two side-by-side dynamic floor sections 10', 10" are shown, it should be appreciated that only one such section could be provided extending either partially or all the way across the fore/aft length of the storage area or trunk T. In any of these embodiments, the dynamic floor section 10' or 10" may be independently displaced from the home position to the fully shifted position in order to allow one to more easily and conveniently use and reach items resting on the first or largest panel 12' which is the furthest from the rear of the motor vehicle sedan MVS.

As should be appreciated, a method is also provided for improving access to a vehicle forward portion VFP of a storage area accessed by an opening at a rear of the vehicle. That method includes the step of equipping the storage area with a dynamic floor section 10' including a plurality of interconnected panels 12', 14', 16' that slide and fold so as to be displaceable between a home position (FIG. 8*a*) and a rearwardly shifted position (FIG. 8*b*). The method may also include constructing the dynamic floor section 10' so that the first panel 12' and the second panel 14' are connected together by a first hinge 18' and the second panel and the third panel 16' are connected together by a second hinge 24'. A third hinge 30' connects the third panel 16$^1$ to the floor F of the motor vehicle sedan MVS.

As further illustrated in FIGS. 8*a* and 8*b*, the method may also include orienting the first panel 12' vehicle forward of the second panel 14' and the third panel 16'. Still further, the method may include providing the first panel 12' with a larger surface area than either of the second panel 14' and third panel 16' or both of the second and third panels combined.

In the embodiment illustrated in FIGS. 8*a* and 8*b*, the method also includes equipping the storage area with a second dynamic floor section 10" including a second plurality of interconnected panels 12', 14', 16' that slide and fold so as to be displaceable between home and rearwardly shifted positions. Handles 66' and 66" are provided to allow independent operation of the respective dynamic floor sections 10', 10".

As shown, the second dynamic floor section 10" may be positioned beside the first dynamic floor section 10'. In fact, the first dynamic floor section 10' may be positioned between a center line CL and an outer left side LS of the motor vehicle sedan MVS while the second dynamic floor section 10" is positioned between the center line and an outer right side RS of the motor vehicle sedan. In any of these embodiments, it is the upper surface of the first panel 12' that forms the vehicle forward portion VFP of the storage area that may be shifted rearwardly toward the access opening at the rear of the vehicle MVS.

Figure 7:
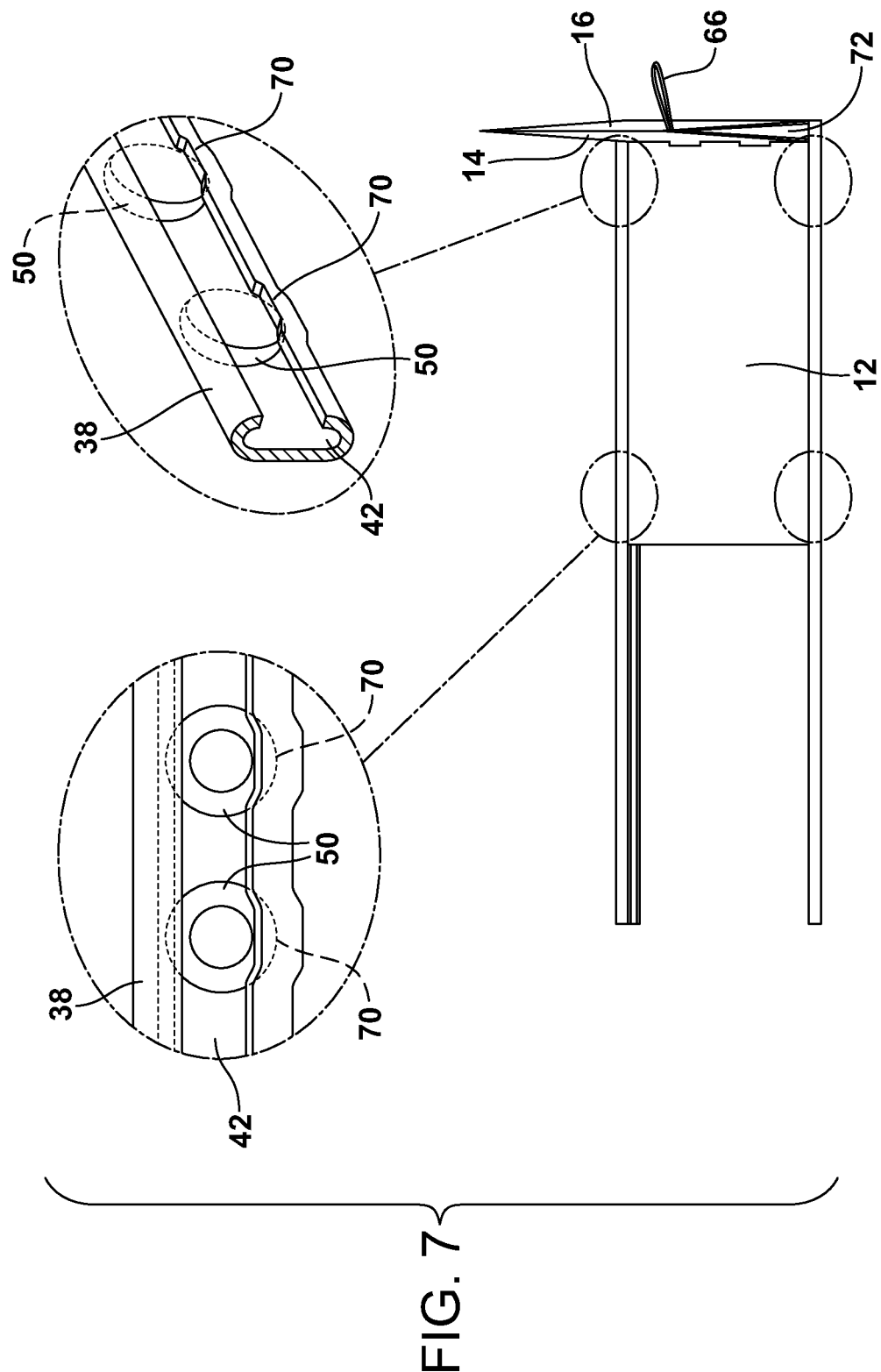
FIG. 7 is perspective and detailed views illustrating valleys provided in the rails to receive the rollers and hold the dynamic floor section in the fully shifted position.

The foregoing has been presented for purposes of illustration and description. It is not intended to be exhaustive or to limit the embodiments to the precise form disclosed. Obvious modifications and variations are possible in light of the above teachings. For example, as illustrated in FIG. 7, each guide rail 38, 40 may include small valleys 70 that receive the rollers 50, 52 and function as detent points to hold the dynamic floor section 10 in the fully shifted position. Here it should be noted that a small angle remains between the two panels 14, 16 in the fully shifted position so as to provide a space 72 into which an operator may insert his fingers. This allows the operator to push the second panel 14 from the latch side 62 toward the hinge side 58 to easily return the dynamic floor section 10 to the home position. All such modifications and variations are within the scope of the appended claims when interpreted in accordance with the breadth to which they are fairly, legally and equitably entitled.

What is claimed is:

1. A vehicle incorporating a storage area, said storage area comprising:
   a dynamic floor section including a stationary guide track carried on the vehicle and a plurality of interconnected panels that laterally slide along the stationary guide track and fold so as to be displaceable between a home position and a shifted position.

2. The vehicle of claim 1, wherein said plurality of interconnected panels include a first panel, a second panel and a third panel.

3. The vehicle of claim 2, wherein a first hinge connects said first panel with said second panel and a second hinge connects said second panel with said third panel.

4. The vehicle of claim 3, further including a third hinge connecting said third panel to said vehicle.

5. The vehicle of claim 2, wherein said first panel has a width $W_1$, said second panel has a width $W_2$, said third panel has a width $W_3$ and $W_1 > W_2$ or $W_3$.

6. The vehicle of claim 5, wherein said first panel is positioned vehicle forward of said second panel and said third panel.

7. The vehicle of claim 6, wherein said storage area further includes a second dynamic floor section including a second plurality of interconnected panels that slide and fold so as to be displaceable between said home position and said shifted position.

8. The vehicle of claim 7, wherein said second dynamic floor section is positioned beside said dynamic floor section.

9. The vehicle of claim 2, wherein said first panel has a width $W_1$, said second panel has a width $W_2$, and said third panel has a width $W_3$ and $W_1 \geq W_2 + W_3$.

10. A method of improving access to a vehicle forward portion of a storage area accessed by an opening at a rear of said vehicle, comprising:
    equipping said storage area with a dynamic floor section including a plurality of interconnected panels that slide and fold so as to be displaceable between a home position and a rearwardly shifted position.

11. The method of claim 10 including constructing said dynamic floor section from a first panel, a second panel and a third panel wherein said first panel is connected to said second panel by a first hinge and said second panel is connected to said third panel by a second hinge.

12. The method of claim 11 including connecting said third panel to said vehicle by a third hinge.

13. The method of claim 11, including orienting said first panel vehicle forward of said second panel and said third panel.

14. The method of claim 13, including providing said first panel with a larger surface area than said second panel and said third panel.

15. The method of claim 13, including providing said first panel with a larger surface area than said second panel and said third panel combined.

16. The method of claim 10, including equipping said storage area with a second dynamic floor section including a second plurality of interconnected panels that slide and fold so as to be displaceable between said home position and said rearwardly shifted position.

17. The method of claim 16, including providing handles for independent operation of said dynamic floor section and said second dynamic floor section.

18. The method of claim 17, including positioning said second dynamic floor section beside said dynamic floor section.

19. The method of claim 18 including positioning said dynamic floor section between a center line and an outer left side of the motor vehicle and positioning said second dynamic floor section between said center line and an outer right side of the motor vehicle.

\* \* \* \* \*